United States Patent [19]

Kawachi et al.

[11] Patent Number: 5,217,741
[45] Date of Patent: Jun. 8, 1993

[54] SOLUTION CONTAINING WHEY PROTEIN, WHEY PROTEIN GEL, WHEY PROTEIN POWDER AND PROCESSED FOOD PRODUCT PRODUCED BY USING THE SAME

[75] Inventors: Kimie Kawachi, Nerima; Mayumi Takeuchi, Kawagoe; Tsuguaki Nishiya, Sayama, all of Japan

[73] Assignee: Snow Brand Milk Products Co., Ltd., Hokkaido, Japan

[21] Appl. No.: 826,946

[22] Filed: Jan. 27, 1992

[30] Foreign Application Priority Data

Jan. 25, 1991 [JP] Japan ................................. 3-23797
Mar. 20, 1991 [JP] Japan ................................. 3-80373

[51] Int. Cl.$^5$ .......................................... A23L 1/0562
[52] U.S. Cl. .................................... 426/573; 426/583; 426/657; 426/104; 426/603; 426/643; 426/652
[58] Field of Search ............... 426/573, 583, 657, 104, 426/603, 643, 652

[56] References Cited

U.S. PATENT DOCUMENTS

| | | | |
|---|---|---|---|
| 4,168,322 | 9/1979 | Buckley et al. | 426/573 |
| 4,226,893 | 10/1980 | Paquet et al. | 426/583 |
| 4,251,562 | 2/1981 | Le Grand et al. | 426/583 |
| 4,362,721 | 12/1982 | Chang et al. | 426/573 |
| 4,675,201 | 6/1987 | Lee et al. | 426/573 |
| 4,978,551 | 12/1990 | Sugino | 426/573 |
| 5,039,538 | 8/1991 | Tamaki et al. | 426/573 |
| 5,039,539 | 8/1991 | Tamaki et al. | 426/573 |

OTHER PUBLICATIONS

Kuwata et al., "Effects of Desalting and Defatting on the Gelling and Foaming Properties of Whey Protein," Nippon Shokuhim Kogyo Gakkaishi, vol. 32, No. 9, pp. 639-645 (1985).

Mulvihill et al., "Gelation of β-Lactoglobulin: Effects of Sodium Chloride and Calcium Chloride on the Rheological and Structural Properties of Gels," Journal of Food Science, vol. 53, No. 1, pp. 231-236 (1988).

Katsuta et al., "Viscoelastic Properties of Whey Protein Gels: Mechanical Model and Effects of Protein Concentration on Creep," Journal of Food Science, vol. 55, No. 2, pp. 516-521 (1990).

*Primary Examiner*—Jeanette Hunter
*Attorney, Agent, or Firm*—Millen, White, Zelano & Branigan

[57] ABSTRACT

A denatured whey-protein-containing solution which can be converted to an irreversible gel without heating characterized by the fact that said whey-protein-containing solution is produced by diluting a solution of non-denatured whey protein to an extent that coagulation of the whey protein does not occur when the solution is heated at a temperature higher than that required to denature the whey protein, and then heating this diluted solution to a temperature higher than that required for denaturing the whey protein, to produce a soluble association of denatured whey protein molecules without causing coagulation, which solution undergoes irreversible gelation simply by the addition thereto of monovalent or divalent salt-derived ions to form a transparent, non-heat-coagulated gel product which is highly resistant to water dissociation and stable to heat and therefore can be used extensively in raw, frozen, or heat-processed foods or other foodstuffs.

25 Claims, 7 Drawing Sheets

F I G. 1 A
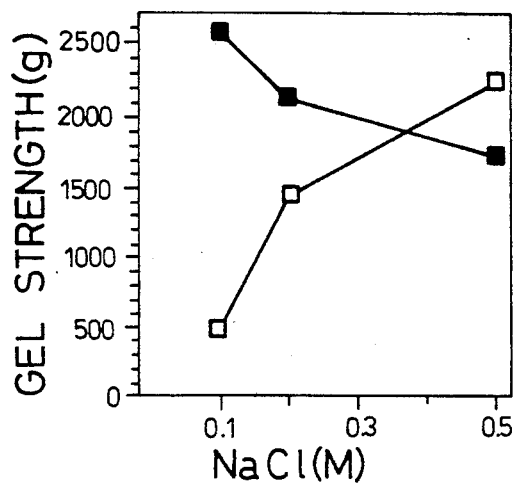
F I G. 1 B
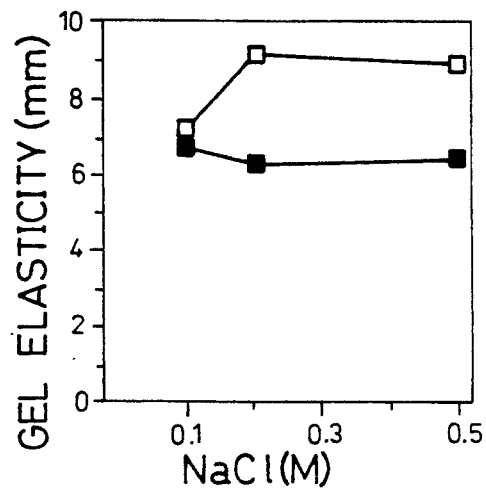
F I G. 1 C
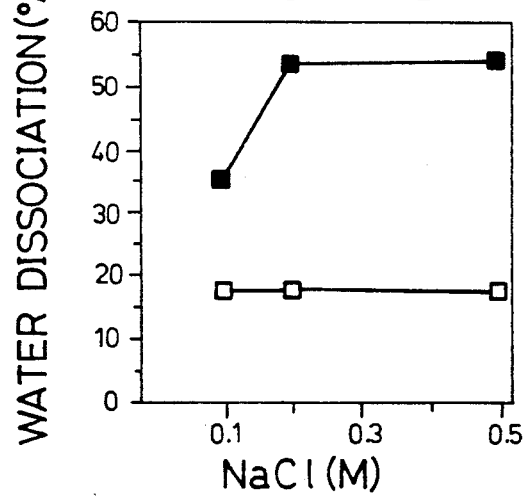
□ : ION-INDUCED GEL
■ : HEAT-INDUCED GEL

■: STANDING IN A STATIC STATE AT 20°C FOR 48 HOURS.

□: STANDING IN A STATIC STATE AT 20°C FOR 24 HOURS.

○: STANDING IN A STATIC STATE AT 5°C FOR 24 HOURS.

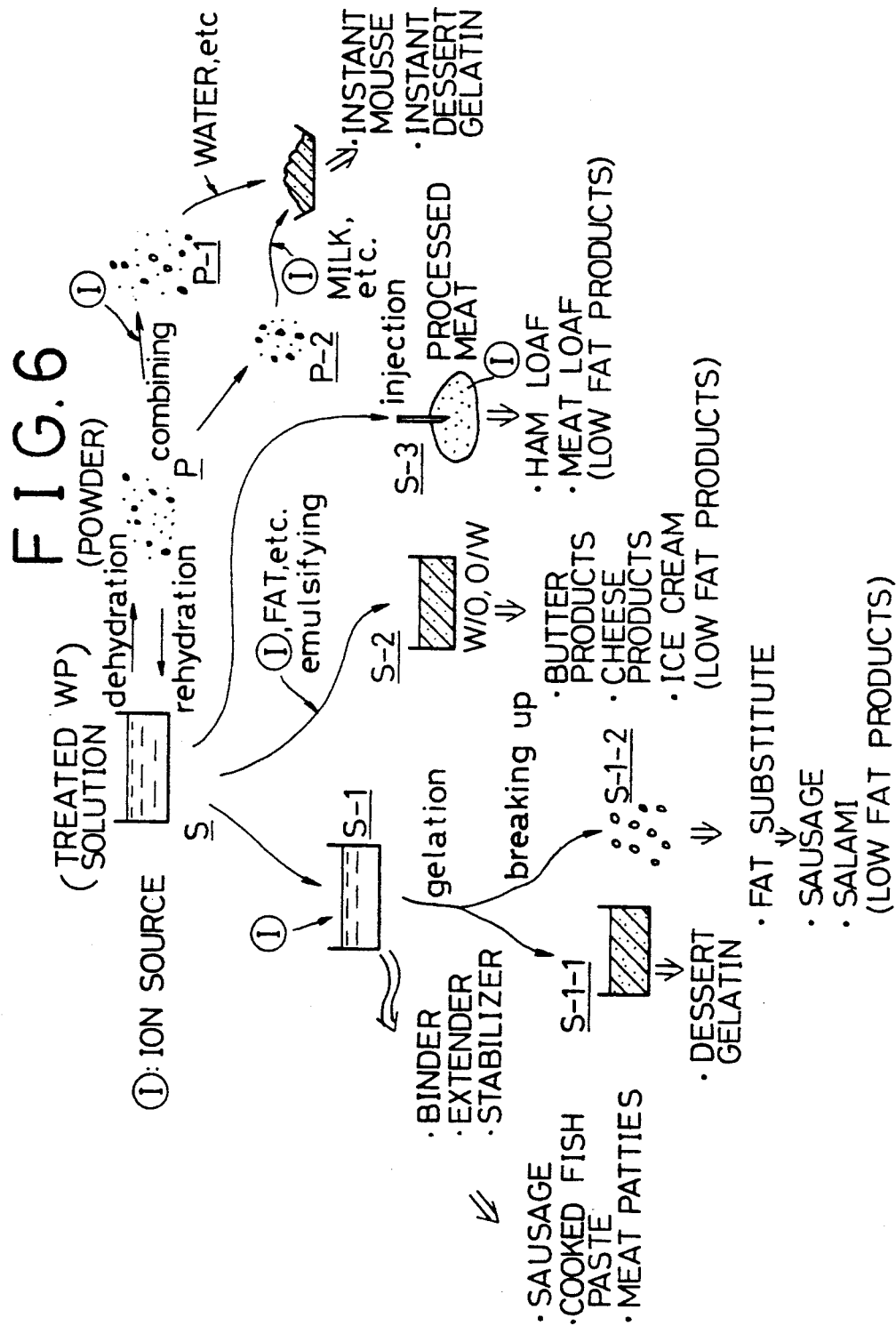

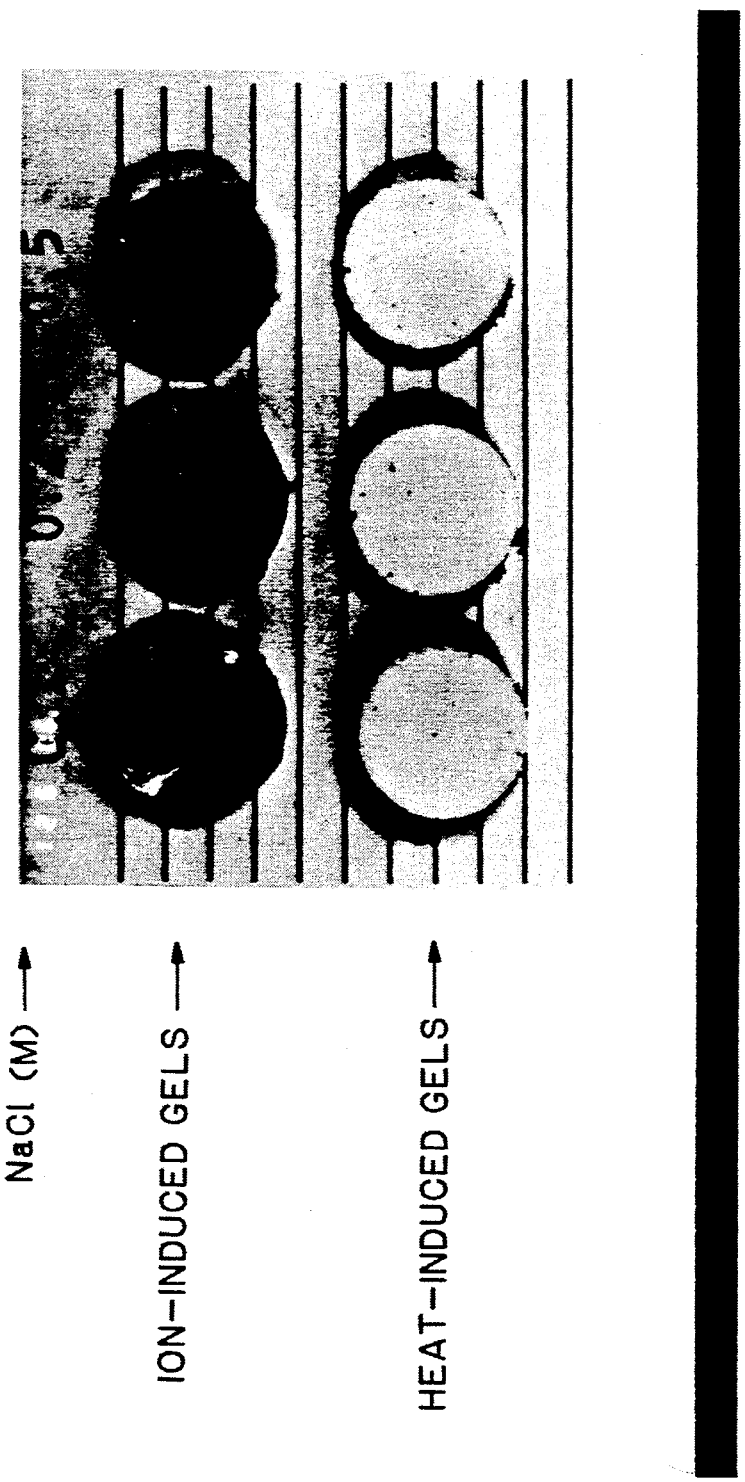

SOLUTION CONTAINING WHEY PROTEIN, WHEY PROTEIN GEL, WHEY PROTEIN POWDER AND PROCESSED FOOD PRODUCT PRODUCED BY USING THE SAME

BACKGROUND OF THE INVENTION

1. Field of the Invention

The present invention relates to a solution containing whey protein which undergoes gelation by the addition of salt-derived ions; a gel produced by gelation of the solution; a powder produced by drying the solution; and processed food products in which the solution, gel or powder is used. The technology related to the present invention is applicable in the field of food manufacturing in which the gelation property and water-retention capacity are necessary.

2. Description of the Prior Art

Whey protein is a general term for proteins present in milk which includes lactoalbumin, lactoglobulin and other proteins and is characterized by the fact that it is heat-denatured at a temperature between 72° and 75° C., and that it can coagulate at a higher temperature than this temperature range.

Accordingly, a heating method is well-known in general as a means of gelation of a whey protein solution and essentially no other means are available.

Considerable research has been carried out on the heat-induced gelation of whey protein and heat-coagulated products of whey protein (Journal of Food Science, 53(1), 231-236, 1988; Nihon Shokuhin Kogyo-Gakkai, 32(9), 639-645, 1985). These gelated products and heat-coagulated products are heated in the presence of salts. However, such heat-induced gels have problems in common, viz., their water-retention capacity is reduced over time and their texture is not smooth enough, although these problems are mostly originated from the salt concentration.

In addition, gelation occurs with heat treatment whereby heating has to be carried out under static conditions. On an industrial scale, it is difficult to manufacture a large amount of gel under these static conditions. In other words, in heating a large mass to obtain a large volume of gel, a long period of time is required to attain the temperature for gelation at the center of the mass, which causes overheating around the peripheral part of the mass, resulting in undesirable scorching and pore formation around the edges. Furthermore, because of the heat treatment, the gels are used limitedly only as supplemental materials in food processing.

OBJECT OF THE INVENTION

An object of the present invention is to provide a new technology in which a gel product, which is not attainable by conventional heat-coagulating methods, and which is highly resistant to water dissociation and has a smooth texture, can be produced without heat treatment in the process for gel formation, meaning that non-heat treatment makes it possible to produce high quality gels on a mass-produced industrial scale, whereby the whey protein which has an excellent nutritious value can be used extensively as a food material.

SUMMARY OF THE INVENTION

The present invention is based on a technology in which a solution or the starting whey protein as a major gellable component is prepared in such a way that the solution will not coagulate upon heating during denaturing; this solution is then heated to denature the whey protein molecules therein without causing coagulation, so that a composition having an irreversible gel structure can be formed from the resultant solution merely by the addition of salts thereto at room temperatures.

Thus, first in a aspect composition, the present invention relates to a heat-denatured whey-protein-containing solution produced by diluting a solution containing non-denatured whey protein sufficiently to prevent coagulation when the solution is heated at a temperature higher than that required to denature the whey protein and then heating this diluted solution to a temperature higher than that required for denaturing the whey protein, to produce a soluble association or denatured whey protein molecules without causing coagulation. Irreversible gelation of said whey-protein-containing solution can be achieved simply by the addition thereto of monovalent or divalent salt-derived ions.

To date, a method like the above-described method, in which a solution of the starting whey proteins is prepared in such a way that it will not coagulate at a heat-denaturing temperature and this solution is heated heated so that the protein molecules in the solution undergo denaturation without coagulation, so gelation by the addition of salt-derived ions to obtain a desirable gel product on an industrial scale, is not known.

In gels formed by conventional methods to date, which is formed by heating in the presence of salts, the proteins are coagulated and the water-holding capacity of the gel is poor. In contrast, the gel obtained according to the present invention (gel coagulated without heating) has a smooth texture, a high water-retention capacity and an excellent transparency. Moreover, in the heating process carried out as a preliminary treatment in the present invention, unlike the conventional heating process for gelation, it is not necessary to heat the protein solution in the static state but the solution can be efficiently heated with stirring and thus an over-all homogeneous treatment is possible for manufacturing on a large scale.

In a second aspect of, the present invention relates to a whey protein gel which is obtained by the addition of monovalent or divalent salt-derived ions to the above-described solution of soluble denatured whey protein.

This gel is characterized by excellent water-holding capacity, smoothness and transparency and is thus extremely useful in the food industry field.

In a third aspect of, the present invention relates to a powder product containing the whey protein, which can be obtained by drying an above-described whey-protein-containing solution in which the protein concentration is 0.5 to 10%. This whey powder is characterized in that gelation is achieved by the addition of monovalent or divalent salt-derived ions such that heating or cooling is entirely unnecessary for dissolution or gelation. Accordingly, it is extremely useful as an instant powdered food.

In a fourth aspect, the present invention is a processed food in which the above-mentioned whey protein gel relates to used.

The present invention solves problems, such as the generation of an odor upon heating and limited use in applicable foodstuffs, which are concomitantly, caused by the conventional means employed for gelation, which require heating only under static conditions. The resulting gel can be used as an irreversible gel material in a wide variety of foods containing highly nutritious whey protein, which can be served raw without heating or used as a gelling material for heat-processed foods. Furthermore, the gel provides a novel processed food which is highly resistant to water dissociation (water bleed-off).

BRIEF DESCRIPTION OF THE DRAWINGS

FIG. 1 shows the effect of the amount of NaCl added to the ion-induced gel and the heat-induced gel prepared as described in Example 1. (A), (B) and (C) illustrate the relation between salt concentration and gel strength, elasticity and water dissociation, respectively.

FIG. 6 is a chart which illustrates examples of end-use embodiments of the whey protein solution of the present invention.

FIG. 7 is a photograph showing the apparent transparency of the ion-induced gel and the heat-induced gel prepared as described in Example 1 (thickness of the gels, 5 mm).

DETAILED DESCRIPTION AND THE PREFERRED EMBODIMENTS

Figure 2A:
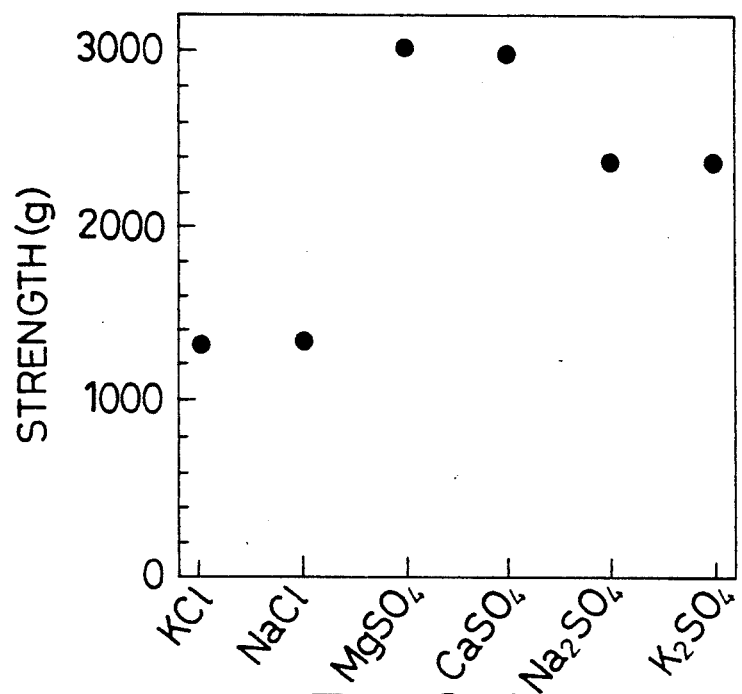
FIG. 2 shows the effects of the types of salts on the ion-induced gel prepared as described in Example 2. (A) and (B) illustrate the relation between the type of salt, and both gel strength and elasticity, respectively.

As will be explained below, according to the present invention, gel formation of the whey protein, is induced by salt-derived ions rather than by heating. Furthermore, the gel structure of the thus-produced whey protein gel is irreversible, resistant to high and low temperatures and has excellent transparency and water-holding capacity. Accordingly, the whey protein gel can be used extensively as an ingredient for various food stuffs, which makes it possible to manufacture novel foods that would not be conventionally possible. Furthermore, since the whey-protein-containing solution is characterized in that gelation is caused simply by salt addition, the solution can be used optionally in the liquid state in combination with other food materials and can be solidified in place while maintaining the solution in a static state, which makes it possible to produce a new foodstuff in which the whey protein is integrated. Furthermore, the practical value of the whey-protein-containing solution is increased when powdered and is useful in instant dessert products or the like.

The present invention will be described in more detail as follows:

The following is an explanation of the solution containing whey protein hereinafter referred to also as "WP") used to produce a gel therefrom by the addition thereto of monovalent or divalent salt-derived ions (e.g., metal ions and/or acid radicals derived from salts) (hereinafter referred to as ion-induced gel).

Techniques for manufacturing foods using the denaturation property of proteins are well-known. Denaturation of proteins generally means partial changes in the structure of protein molecules which results in changes in properties of the proteins. Particularly in heat denaturation, deformation and association of protein molecules occur, which results in coagulation of the protein. The association and coagulation are caused by intermolecular bonds such as hydrophobic bonds, hydrogen bond and ionic bonds; however, it is difficult to elucidate these relationships and predict the physical characteristics and properties of the resulting gel. Furthermore, since individual proteins contain different amino acids in different numbers, it is not possible to expect the same effects on of the proteins. The present inventors intensively studied non-heat coagulated gels of whey protein and found the possibility of a ion-induced gel, thereby achieving the present invention.

In conventional technologies, in order to form a heat-coagulated whey protein gel, firstly a whey protein solution must contain the whey protein at a concentration above a certain level (5% or more) and salts at a concentration above a certain level (0.2% or more as ash). At concentrations below these levels, turbidity and precipitation are observed but overall gel formation does not occur. However, it was determined that under normal conditions of low salt concentration in which a gel is not formed, whey protein molecules are nevertheless denatured by heat. Thefore, by heating to a temperature greater than or equal to the whey protein denaturing temperature without causing coagulation, the whey protein molecules can still be deformed without causing intermolecular aggregation to make the surface of the molecules highly hydrophobic. Salt-derived ions facilitate the formation of hydrophobic bond in the soluble denatured proteins, thus forming a network structure and hence a homogeneous gel. In conventional technologies, a drastic intermolecular aggregation occurs during heating. Unlike the conventional technologies, when heating is conducted at a low salt concentration, the molecules are only partly denatured, e.g., forming rosary-like strings, to produce a soluble association of whey protein molecules. Hydrophobic bonds of the molecules are thereafter formed by the addition of salt-derived ions so that the protein molecules do not randomly aggregate but form an appropriate network structure, which results in a formation of gel having excellent transparency and water-retention capacity.

Thus, to induce gelation with, salt-derived ions, the whey-protein molecules must already be sufficiently deformed and their hydrophobicity increased. The desired hydrophobicity of the whey protein in the solution can be evaluated as 50 [FI/mg-protein] or more preferably 100 [FI/mg-protein] or more based on the following definition:

Hydrophobicity: Fluorescent intensity (FI)/the content of whey protein (mg) present in a column. The fluorescent intensity of the solution, in which whey protein is diluted at a certain concentration (approximately 0.1–0.3 g/l) and to which 8 mM of 1-anilinonaphthalene-8-sulfonic acid as a fluorescent probe is added, is measured with a spectrophotofluorometer at 470 nm of emission wavelength, 370 nm of excitation wavelength. In order to deform the molecules to such an extent, it is necessary to raise the temperature above the whey-protein denaturation temperature without causing heat coagulation of the whey protein. Accordingly, it is preferred to reduce the salt-derived ion concentration as much as possible during heat treatment so as not to cause the intermolecular reaction. Furthermore, since the electric charge of the molecules also has an influence on deformation of the molecules, it is preferred to avoid a pH range where chemical denaturation may occur. This is because the object of the present invention is not to induce precipitation or cloudiness of the whey protein but to form a homogeneous gel structure.

In this regard, it should be noted that although it is a known fact that the presence of metal ions is usually necessary for protein coagulation, the concept that a protein does not coagulate without metal ions is technologically and entirely different from the concept that a protein coagulate merely by the addition of metal ions and, that the thus produced gel is homogenous. It is an extremely surprising discovery that an homogenous protein gel can be formed without reheating simply by the addition of metal ions. Further, in addition to metal ions (cations), acid radicals (anions) derived from salts can also induce gelation of the protein solution of this invention.

In general, heat treatment in the presence of salts has been conventionally carried out to produce the whey-protein gel. It should be noted that the whey-protein gel of the present invention is different from conventional gels not only in its formation process but also in its physical characteristics. Gelation processes are extremely complicated and the resulting gels vary depending on the processes used. The present inventors have found that this novel gel of the present invention is outstandingly useful in the food industry.

In the present invention, any soluble whey protein preparation generally available can be used as the whey protein in the whey-protein-containing solution. For example, a whey preparation isolated in a process of manufacturing dairy products such as butter and cheese can be used after concentrating the proteins by ultrafiltration. A whey protein concentrate (WPC) and a whey protein isolate (WPI) are preferable examples of the whey protein since they are relatively low in their ash concentrations and tend to form elastic gels. In general, the whey protein concentrate has a protein concentration of 50% or more. Hereinafter the amount of whey protein refers to the weight of the protein contained in a whey protein product such as WPC and WPI. $\beta$-Lactogobulin isolated from whey protein also can be used instead of when protein.

The starting whey protein is at a concentration which does not coagulate upon heating, even at a temperature above the heat-denaturation temperature of whey protein. However, since, in addition to the denaturation temperature, various factors such as pH, salt concentration and solutes, facilitate protein coagulation, an appropriate concentration of any specific whey protein solution cannot be designated by single value. The concentration of whey protein in a solution according to the present invention, however, has to be sufficient to permit gelation to occur simply by the addition of monovalent or divalent salt-derived ions. For practical applications in a preferable embodiment, a whey protein concentration is 0.5 to 20%, an ash concentration is less than 1.0% and pH is 6.0 to 9.0. If the ash concentration exceeds 1%, a smooth gel cannot be formed even with the addition of salt-derived ions because the whey protein undergoes gelation or aggregation during heating. To control the ash concentration, the ash concentration of the whey protein source can be adjusted if necessary. However, the ash concentration of purified whey protein is normally 1.4 to 6% which in solution is less than 1% so that adjustment of the concentration is not necessary. If the whey protein is at a relatively high concentration, in which case the whey protein tends to be denatured when heated, the ash concentration of the whey protein source may be preliminarily adjusted to a lower concentration. Alternatively, once in a solution, desalting by ultrafiltration, electric dialysis or the like may be carried out to decrease the ash concentration. In the ash components, those which exist as monovalent or divanlent salt-derived ions, such as calcium, sodium, potassium and magnesium, have an effect on gelation during heat treatment so it is preferable to maintain a low concentration of these salt-derived ions. Practically, it is preferable to adjust the total concentration of calcium, sodium, potassium and magnesium to 500 mg/100 g or less. Furthermore, from this point of view, it is desirable to use deionized water in the preparation of the whey-protein-containing solution.

In the case where the concentration of whey protein is less than 0.5%, gelation hardly occurs even after the addition of salt-derived ions. The whey protein concentration is preferably 2.0% or more. On the other hand, if the concentration of whey protein exceeds 20%, gelation may occur during heating due to the increase in viscosity. The whey protein concentration is preferably 15% or less. However, even if the whey protein concentration should exceed such a high level, there would be no problem if the ash concentration is extremely low, since no gelation occurs anyway. Although it is possible to reduce ash content to a very small amount, the above-mentioned range is preferable in practice because an increase in the whey protein concentration to such a high level is not industrially advantageous and, furthermore, the desalting requires a sophisticated technology. In the case where pH is lower than 6.0, the whey protein aggregates and precipitates during the heating process so that a smooth gel can not be formed; in the case where pH is above 9.0, a harmful substance, lysinoalanine, is formed by heating and also the flavour is not very good and therefore the resulting gel is not suitable for foodstuffs. The lower the pH when adding salts after the heat treatment, the more rapidly the coagulation tends to occur.

On the other hand, the present invention is also applicable to the embodiment in which salt-derived ions do not act directly on a whey-protein-containing solution. More specifically, a solution containing the whey protein is dried to a powder from which a solution is prepared and is used in the same manner as with the above-mentioned whey-protein-containing solution. This embodiment is extremely useful for instant foods. Accordingly, in this embodiment, it is not necessary to adjust the whey protein concentration in the whey-protein-containing solution prior to drying to a powder as long as the whey protein concentration at the time of gelation is within the above-mentioned range of about 0.5 to 20%. This is because it is possible to adjust the whey protein concentration in the whey-protein-containing solution when preparing the gel product.

In this embodiment, the whey protein concentration in the whey-protein-containing solution is preferably in a range of about 0.5 to 10%. In the case where the concentration is less than 0.5%, drying of the solution is inefficient whereas in the case where the concentration exceeds 10%, the heat from the drying process may cause the whey protein to become insoluble. Heating during the drying process is different from heating of ordinary solutions; the whey protein concentration, i.e., the solid content is not constant but continuously increases during heating, which, as a result, makes the solution more susceptible to denaturation. However, according to the present invention, insolubilization hardly occurs when the whey protein concentration is within the above-mentioned range even if the whey-protein-containing solution is dried to a powder by conventional means.

Accordingly, the whey protein concentration in a whey-protein-containing solution can be determined as a function of an embodiment in which gel is formed from the whey-protein-containing solution. In considering embodiments in which drying to a powder or the like is carrout, the whey protein concentration in a whey-protein-containing solution is preferably in a range of 0.5 to 20%.

Furthermore, the expression "whey-protein-containing solution" as used herein normally refers to an aqueous solution but also more widely means that the solution is a fluidal liquid. Accordingly, the whey-protein-containing solution contains the whey protein as a major component for gelation but furthermore can contain, if necessary, gelling adjuncts such as gelatin, seasoning agents such as saccharides, amino acids or the like and other auxiliary agents such as flavoring and coloring agents as long as they have no adverse effect on gelation. Furthermore, when the solution is dried to a powder, saccharides, dextrin or the like may be added as a stabilizing agent or as an excipient. Furthermore, since said solution is in a solubilized state, it is also naturally possible to use it in an emulsified state by adding oils, fats or the like prior to the addition of salts (salt-derived ions). Namely, the whey-protein-containing solution can occasionally be made into an emulsion and any homogenous, fluidal liquid can be used as a solution of the present invention, irrespective of other properties such as viscosity.

In the present invention, "heating process" means to heat above the temperature at which the whey protein starts heat-denaturing. The temperature at which the whey protein starts denaturing cannot be determined unconditionally but is determined conditionally by other factors such as pH, whey protein concentration, salt concentration and pressure. In general, 65° C. or above under the normal pressure is used. Accordingly, simple treatments such as denaturation under a high pressure which is not related to heat denaturation are not included in the present invention. However, any treatment with concomitant pressure treatment in order to lower the heat-denaturation temperature under a certain pressure is included. It is believed that heat and high pressure cause different deformation in the molecules.

Furthermore, in the present invention, the expression "gelation can occur only by the addition of monovalent or divalent salt-derived ions" means that the gelation can be fundamentally caused simply by the addition of these salt-derived ions to a whey-protein-containing solution and, in practice, the gelation proceeds in a static state after the addition of salt-derived ions to form a gel.

The term "Monovalent or divalent salt-derived ions" as used herein represents such salt-derived ions as calcium ions, sodium ions and magnesium ions, which are all generated as metal ions (cations) from salts; and hydrogenphosphate ions, sulfate ions and citrate ions, which are all generated as acid radicals (anions) derived from salts. More precisely, it is convenient and preferable to add ionizable salts including these salt-derived ions and/or acid radicals to a whey-protein-containing solution. Since the present invention relates mainly to foods, these salts are preferably allowable as a food additive. Examples of applicable salts include sodium chloride, potassium chloride, magnesium sulfate, calcium sulfate, sodium sulfate, calcium chloride, potassium sulfate, sodium polyphosphate, sodium diphosphate, sodium monophosphate and sodium citrate. A combination of two or more of these salts can also be used. Furthermore, if such salts that are used as seasoning and flavoring components in food are used, it is not necessary to add salts specifically for gelation and salts can be added in an amount within the range of ordinary use in the gelation step and the total salt concentration can be adjusted in a later process. Representative salts of this type are sodium chloride, potassium chloride or the like. Furthermore, ions other than monovalent or divalent salt-derived ions such as aluminum ions can be occasionally used.

The concentration of salt-derived ions to induce gelation of the above-mentioned whey-protein-containing solution (which includes a solution reconstituted from the powder prepared from the whey-protein-containing solution) cannot be generally prescribed because it varies depending on such factors as the whey protein concentration, the state of denaturation of whey protein molecules, the reaction temperature and pH and, furthermore, the purpose and use of the gel. However, the salt-derived ion concentration is generally 0.05M or more. Accordingly, taking the amount of salt-derived ions already present in the whey-protein-containing solution into account, the amount of the salt-derived ions to be added may be adjusted to attain the above-mentioned concentration. Gelation tends to be difficult if the concentration is lower than the above-mentioned concentration. As long as the whey protein concentration is within the range of ordinary use, there is no limit as to the highest possible concentration. However, in the case where an extremely high concentration is used, the solution rapidly becomes viscous and gelation occurs, which results in difficult handling, or the whey protein aggregates and dissociates from the water phase, which makes the formation of a gel with high water-retention capacity difficult. At the same time the use of high concentration enhances the saltiness so that the application to ordinary foods may be extremely limited. An ordinary range is normally about 0.02 to 2.0M, preferably 0.05 to 2.0M, more preferably 0.1 to 1.0M, in which a gel of good quality can be formed. For convenience, when sodium chloride is used, the concentration is about 0.1 to 8%.

However, when a powder prepared from the whey-protein-containing solution is used, the above-mentioned disadvantages are not frequently observed in spite of the relatively high salt-derived ion concentration since the salt-derived ions are added simultaneously with solution of the powder and the gelation takes place without any particular treatment.

Since characteristics of the gel are affected by the kind and concentration of salt-derived ions being used, it is necessary to take these effects into consideration in selecting salts. Furthermore, in addition to salts, anything which supplies desired salt-derived ions can also be used and thus food materials can be used as a source of salt-derived ions. Furthermore, the rate of supply of the salt-derived ions affects gelation and it is possible to gradually supply the salt-derived ions by using food materials to control the property of the gel. This is to be described later.

The above-mentioned whey-protein-containing solution can be produced by preparing a solution containing the whey protein in a concentration range at which the whey protein is not denatured by heating and which gelation occurs after heat treatment by the addition of monovalent or divalent salt-derived ions, and then heating the solution above the temperature at which the whey protein starts heat-denaturation while maintaining a soluble state.

The whey protein concentration and other conditions are as described above. The temperature for heat treatment is also as described above; however, in the present invention, unlike in conventional methods, heat treatment in the static state is not necessary because the whey-protein-containing solution remains in solution without gelation during the heat treatment. Consequently, any heating means with high thermal efficiency, such as heating with stirring, can be arbitrarily adopted, which makes it possible to produce the gel on an industrial scale. Any heating means can be adopted; for example, a surge tank can be used.

The heating temperature is normally 65° C. or higher as described above; however, temperatures as high as 80° C. are preferably used because deformation of whey protein molecules is facilitated at higher temperatures. In particular, in the case where the whey protein concentration is relatively low, more dynamic deformation of the whey protein molecules is required. Furthermore, the heat treatment can be carried out under normal pressure; however, in some cases, a treatment such that the pressure is raised to lower the heat denaturation temperature may be adopted. Practical pressures for use range between about 1 and 1.2 atm.

The heating time has a smaller effect than the heat temperature; however, if the time is not long enough, sufficient denaturation cannot be attained. If the time is too long, excessive denaturation occurs, which, however, has no serious effect. Naturally, the appropriate heating time depends on the heating temperature to be used; the higher the temperature, the better the results attained in a short period of time. In practice, heating time varies between about 2 seconds to 60 minutes after the temperature reaches to the desired level.

Embodiments to eventually form the whey protein gel (ion induced gel) using the whey-protein-containing solution after heat treatment is primarily divided into two types. First, the gel is formed by allowing salt-derived ions to act on the whey-protein-containing solution (embodiment S); secondly, the whey-protein-containing solution is dried to a powder, the powder is mixed (or not mixed) with salt-derived ion source to prepare a powder mixture, and then a liquid substance (or a liquid substance containing salt-derived ions) is added to the mixture, or said mixture is added to a similar liquid substance to form a gel (embodiment P).

The component powdered from the solution containing the whey protein is reconstituted into the original whey-protein-containing solution by adding deionized water or the like. Accordingly, the reconstituted solution can also be used in the above-mentioned embodiment S.

Examples of the embodiments for the use of the whey-protein-containing solution are illustrated in FIG. 6 (Embodiment identifications hereinafter referred to are indicated in FIG. 6). Thus, the utilization of the gel can be widely extended and is extremely significant for the food industry where the gel can be used in a wide variety of foods, particularly in the area of low calorie foods, instant foods, quality enhancers or the like.

First, one aspect of embodiment S is to induce gelation by adding salt-derived ions to a solution (embodiment S-1). In embodiment S-1, by forming the gel in the static state, said gel without further processing become, for example, dessert jelly, hors d'oeuvre jelly or the like (embodiment S-1-1). If the gel is crushed into pieces after gel formation, it can be used, for example, as a substitute for fat granules (S-1-2), which is applicable to coarsely-minced sausages, salami sausages or the like to produce low calorie processed meat and fish foods.

Secondary, an emulsion which is highly stable in spite of its relatively high water content can be obtained by adding fat, salt-derived ions, etc. to the solution of embodiment S, emulsifying and mixing the resulting solution to prepare a W/O (water-in-oil) type or O/W (oil-in-water) type emulsion structure and retaining the structure in the static state to form the gel (S-2). Although the water content is relatively high, the emulsion is stable enough to manufacture low fat products. Examples of the products include low-fat butter, low-fat cheese and low-fat ice-cream.

Furthermore, by adding or injecting the solution of embodiment S to a material containing salt-derived ions, gelation in said material can be induced (S-3). For example, the embodiment can be applied to the production of processed meat and fish foods, such as raw ham, sausages and meat loaf, with a desirable low-fat content and an excellent shape-retention capacity.

In addition to the embodiments mentioned above, said solution can be effectively used as various agents for foodstuff, such as an adhesive agent, an extender, an agent to prevent water dissociation or a stabilizer. In this case, salt-derived ions can exist either in the material or in the solution. This is because gelation after the addition of salt-derived ions is not drastic and therefore operational difficulties rarely occur. The addition of whey proteins as a food additive can be conducted in the form of a solution, a slurry on a gel. The slurry and gel can be prepared from a whey-protein-containing solution (heat-treated) in the presence of salt-derived ions.

The whey-protein-containing solution can be a solution obtained by rehydrating a powder, said powder obtained by dehydrating a whey-protein-containing solution, or a solution obtained by defrosting a frozen one. When a whey protein slurry or gel is used as a binder, extender or the like in a processed food such as a cooked fish paste or sausage, the resultant gel strength of the food can be greater than when a whey-protein-containing solution is used. When the whey-protein-containing solution is slightly gelled as a first gelation, it is possible to form a former gel upon incorporation with other food materials by promoting a second gelation.

In this instance, a slurry form is preferred. If the solution is firmly gelled before incorporation with other food materials, the resulting gel may not be as firm as when a slurry is used, because the gel network may be destroyed in the incorporation process and may not be restored.

If the solution itself is used and the solution is overly dispersed into food materials, gelation may be disrupted.

Furthermore, in embodiment P, gel is formed from a powder which is handy for handling, storage and conveyance and this is very useful because the solution can be prepared from the powder at the time of gelation. The prepared solution can be used in the same manner as in the above-mentioned embodiment S. By preliminarily mixing a salt-derived ion source and other materials with the powder to make a powder mixture (or granules), instant dessert, hors d'oeuvre jelly or the like, for example, can be produced (P-1). Namely, by adding milk, water or the like to the mixture, mousse, milk jelly or the like can be produced. Furthermore, if salt-derived ions contained in milk or the like are used, none or a very small amount, if any, of salt-derived ion source may be added to the mixture (P-2).

The gels in any of the embodiments above require no heat treatment and, moreover, have excellent resistance to freezing and heat, so that it is applicable to either raw products, frozen food or heat-processed food. These characteristics are not known to date and are extremely unique.

Individual embodiments are explained as follows.

First, in order to manufacture a gel product using the whey-protein-containing solution (embodiment S), the above-mentioned whey-protein-containing solution is prepared at a temperature up to 65° C. exceeding the freezing temperature, monovalent or divalent salt-derived ions are added to the solution and then the resulting solution is maintained at a temperature up to 65° C. exceeding the freezing temperature in a static condition for gelation.

The salt-derived ions to be added are those described above. However, it has to be taken into consideration that the rate of gelation is affected by the kind of the ions. For example, sodium ions and potassium ions cause gelation at a relatively mild rate even when added to the whey-protein-containing solution in a highly dissociated form. On the other hand, calcium ions tend to facilitate association and to form an aggregate. Accordingly, it is desirable to gradually react calcium ions with the whey protein by such means that a suspension of a slightly soluble calcium salt is, for example, mixed with the whey protein solution, or alternatively, that calcium in a form which binds partially to cow's milk proteins, such as the calcium in powdered milk, is added to the whey protein solution. Thus, the slow gelation results in formation of gel with fine texture, which improves the strength, elasticity and water-dissociability of the gel and furthermore improves the transparency of the gel.

Various food materials containing salts, such as whole milk powder, skim milk powder, cheese, condensed milk, spices and "surimi" (fish paste), which have a relatively high salt concentration and can provide 0.02M or more of the final salt-derived ion concentration upon addition, can be used unlimitedly as long as a certain level of the whey protein concentration is maintained, from the point of view that those food materials can control the rate of supplying salt-derived ions into the solution and that they enhance the value of the gel itself as a food. Said certain level of the whey protein concentration is 0.5% or more which is the same as that for the above-mentioned whey-protein-containing solution and there is no upper limit. Accordingly, if a substantial change occurs in the total volume, for example, when a salt solution is added to the whey-protein-containing solution, meaning that the whey-protein-containing solution is diluted, the concentration of the whey-protein-containing solution may be previously adjusted to a level not less than 0.5% after the addition of the salt solution.

The molar concentration of salt-derived ions also relates to the association ratio of the salt-derived salts, therefore to express the concentration as a molar concentration is not always practical and for convenience the concentration can be expressed as a salt concentration of 0.1% of more. A preferable concentration of salt in solution ranges between 0.1 and 12%. Incidentally, when a food material having good solubility such as skim milk powder is used as a salt-derived ion source, the ash content of the material is conveniently used as an index of salt concentration. Empirically, 20–55% of ash derived from the skim milk powder in the solution is considered to function as salts.

Furthermore, the kind of salt has to be taken into consideration, since it has an influence on the strength of the gel. Namely, in general, divalent salt-derived ions stimulate gelation more than monovalent salt-derived ions to give strength to the gel. Accordingly, if a gel with higher strength is a target, $MgSO_4$, $CaSO_4$ or the like, for example, may be used. Furthermore, if the same molar concentration of Na and K salts is used, $Na_2SO_4$ and $K_2SO_4$ have higher ion concentrations (having increased ionic strength) than NaCl and KCl, respectively, which therefore tends to harden the resulting gel.

Furthermore, as to the concentration of the salt-derived ions, the higher the concentration, the greater the influence on the physical properties of the gel, which results in desirable gel strength, elasticity and water-dissociation rate. This tendency can never be observed with any gels from conventional technologies. In heat-coagulated gels produced by ordinary heating, aggregation is promoted excessively with an increase in the concentration of added salt so that an appropriate network structure cannot be formed, which results in deterioration in gel strength, elasticity and water-dissociation rate. In other words, in conventional gels, during the heating, aggregation between molecules and the formation of network structure occur simultaneously so that the molecular aggregation interferes with sufficient development of the network structure. In the whey-protein-containing solution of the present invention, the concentration of salts or salt-derived ions is significantly low at the time of heating so that the aggregation between the whey protein molecules does not proceed excessively and the molecule are linked to some extent like beads, which results in a gradual formation of the network structure with the addition of salts. Consequently, it is assumed that the matrix of the network structure is large and strong, which can be observed as a characteristic of the gel. Furthermore, as compared to the conventional heat-coagulated gels, the ion-induced gel is characterized by its extremely high transparency. The transparency is improved under conditions where gelation proceeds gradually; for example, the concentration of salt-derived ions is reduced, the temperature for gelation is lowered, or the rate of adding the salt-derived ions is reduced. When the gel is used as food materials, the transparency is an important factor. In this light, the advantages of said gel are incompafarable to that of a gel produced by conventional means.

Furthermore, the temperature of the whey-protein-containing solution at the addition of the salt-derived ions is preferably 65° C. or lower, and higher than the freezing temperature.

The temperature in the static state after the addition of the salt-derived ions is 65° C. or lower, preferably 60° C. or lower, and higher than the freezing temperature. At any temperature in this range, gelation takes place. However, in this temperature range, the higher the temperature, the more rapid is gel formation.

If salt-derived ions are added and then the solution is allowed to stand at a temperature higher than 65° C. denaturation by heating in the presence of salts occurs, which results in formation of a turbid gel with a high degree of water dissociation.

The whey-protein-containing solution which is treated by heat is cooled to 65° C. or lower but higher than the freezing temperature. Salt-derived ions can be added anytime after cooling. Namely, it is not necessary to immediately react the salt-derived ions once the whey protein is treated by heat because the change due to the heating is irreversible. Accordingly, after the heat treatment, the whey-protein-containing solution can be stored in the liquid state or in a frozen state as necessary and then distributed in either form. However, when stored in the frozen state, denaturation by freezing may occur and therefore other components may be added to prevent this denaturation.

Salt-derived ions are added to the whey-protein-containing solution at an appropriate time after the heat treatment. After the addition, the solution is fundamentally maintained in a static state. The time required for gelation depends on the temperature; the higher the temperature, more rapid is the gelation. Accordingly, the time can be adjusted as desired by controlling the temperature. However, it has to be taken into consideration that a gel rapidly formed has poorer transparency as compared to a gel slowly formed and that rapid gelation has effects on elasticity, strength, water dissociability of the gel. In general, the time required for gelation is between about 1 minute to 24 hours. Furthermore, the feature of the gel changes with time and gel strength also changes after the gelation. Gel strength tends to increase after the onset of gelation but stabilizes within 1 to 7 days.

An embodiment in which the whey-protein-containing solution is first dried to a powder from which a gel is formed (embodiment P) is explained as follows.

The whey protein in the powder form is essentially soluble; therefore a solution prepared using the powder can be used in the same manner as with the above-mentioned whey-protein-containing solution. Thus, gel can be formed under the same conditions described above in regards to temperature, salt-derived ion concentrations and so forth. However, in this embodiment, new effects owing to the powdering are brought about.

First, in a powdering process, the whey protein concentration increases while being dried by heat and the whey protein becomes more susceptible to heat. Accordingly, the whey protein in the whey-protein-containing solution preferably should range from about 0.5% to about 10% as described above.

However, if the powdering process does not generate excessive heat, the whey protein concentration need not be adjusted. For example, if the powder is prepared by freeze-drying, the effect of heating can be minimized.

As to the powdering, any means by which no overheating (temperature above about 90° C.) of the whey protein occurs can be used without any restriction. For example, spray drying, continuous vacuum drying and freeze drying can be applied. In spray drying, the system is controlled so that the powder itself is exposed for several minutes only to a temperature of about 90° C. On the other hand, in dram drying, the whey protein tends to be overheated and becomes heat-denatured and insoluble.

In drying, in order to prevent excessive denaturation of the whey protein and to make the reconstitution easy, saccharides, dextrin or the like is preferably added to the whey-protein-containing solution in advance. The amount to be added is normally about 10 to 60% per unit weight of the whey protein. The form of the powder to be obtained (hereinafter referred to as whey protein powder) can arbitrarily be designed depending on the use. The grain size is not particularly limited. Granular form is preferable in terms of solubility. Granulation can be carried out by known methods using a fluidized bed and a dram, for example.

Further, as described above, various additives can be contained in the whey-protein-containing solution in advance, so that the powdered whey protein can have desired taste, flavour and color, which results in increased value for practical usage. Furthermore, supplemental agents can be separately added to the whey protein powder freely as long as the resulting whey protein powder can still form a gel. Unlike the whey protein-containing solution, the whey protein powder thus obtained can be conveniently distributed with extreme ease-of-handling. Furthermore, the change in quality of the whey protein powder with time is so small that it can be stored for a long period of time if appropriately packaged.

Subsequently, the whey protein powder thus obtained is dissolved in an aqueous solvent to give a whey protein concentration of 0.5 to 20% in solution. Gelation of the solution takes place easily by reaction with salt-derived ions. The principle of the gelation is the same as described for the above-mentioned embodiment S. However, in the present embodiment, depending on the purpose of a gel, the whey protein concentration of more than 20% can be used without difficulty, since there is no technical problem if the dilution ratio of the whey protein powder is small and the temperature is high. Furthermore, when other materials such as sugars are dissolved in the diluted solution, gelation of the solution becomes difficult and therefore the whey protein concentration should be increased. This embodiment is divided into two types; one embodiment in which salt-derived ions are added to the solution after the solution is prepared and the other embodiment in which the preparation of the solution and gelation with the salt-derived ions are carried out simultaneously. The former is carried out in the same manner as described above for embodiment S, which results in the formation of a smooth and transparent gel under static conditions.

The latter can be designed to effect gelation from the beginning and, furthermore, the whey protein can be used at higher concentrations so that a gel with unique properties can be formed. However, it has to be taken into consideration that if a gelation rate is too fast, dissolution of the whey protein powder is disrupted and thus the capacity for gelation decreases.

Accordingly, it is preferable to react the salt-derived ions with the solution after the whey protein powder is sufficiently dissolved. However, if appropriately granulated, all the components can be mixed to form granules.

The whey protein powder is dissolved in an aqueous solvent and the above-mentioned salt-derived ions are added to the solution. However, if appropriately granulated, the whey protein powder can be added to cow's milk used as the aqueous solvent, for example, to prepare a gel-like structure (P-2). Furthermore, since skim milk powder can also supply calcium ion or the like, a similar gel-like substance can be prepared by adding water to a composition which is made by mixing the whey protein powder and skim milk powder (P-1).

Embodiment P is appropriate to prepare instant desserts. Namely gel-like desserts can be easily prepared without heating or cooling.

An example of ingredients for desserts with the whey protein powder containing salt-derived ions is as follows:

Whey protein powder (whey protein content: 50–100%, water content: 3–7%) — 20–60% by weight
Skim milk powder (ash: 7.9%, milk solid: 87.3%, water 3.8%) — 20–55% by weight
Saccharides — 15–60% by weight
Flavoring agents, coloring agents — in a small quantity Among the ingredients given above, skim milk powder can be supplemented with or replaced by sodium citrate or phosphate; furthermore, the representative saccharide is sucrose but other sugars such as glucose and paratinose can be used. Other ingredients can be added if necessary. Furthermore, gelating agents such as pectin, carageenin, guar gum and casein as auxiliaries for gelation can be additionally used. However, the major ingredients for gel structure should be the whey protein.

In embodiment P-2, the ion-containing composition is not mixed together with the whey protein powder. Also in this embodiment, the ingredients are mixed in a similar mixing ratio calculated as solids by weight. Further, ash in the skim milk powder comprises calcium, sodium, magnesium and the like. For convenience sake, salt content can be evaluated as 20–55% of the ash content, as mentioned above. Thus, based on the ash content, a necessary amount of skim milk powder can be added.

Thus, in the present invention, there is no heat treatment in the process of gelation. In this regard, the gel is similar to gelatin gel and agar gel. However, the gel of the present invention is fundamentally different from these gels in that the gel is irreversible; namely once gel is formed, the gel is not destroyed by heating. Accordingly, the gel formed in this invention can be re-heated if necessary in such a manner that, for example, during the process of manufacturing ham, sausage or the like, the whey protein-containing solution which is previously heated is injected into a molded salt-preserved meat whereby a gel of whey protein is first formed by being in contact with the salts in the meat and then the meat protein is cooked by heating. As a result, water dissociation is reduced and the yield is improved, which has never been achieved in gels made by conventional technologies.

The following are explanations of processed foods produced by using the whey protein gel of the present invention. These foods correspond to embodiments S-1 to P-2 described above.

The first example for embodiment S-2 is a processed food consisting of a W/O type or O/W type emulsified material which is obtained by first adding oil and fat and then monovalent or divalent salt-derived ions to the whey protein-containing solution. Since the whey-protein-containing solution is in a liquid form, it can be mixed with various auxiliaries, and by addition of the salt-derived ions, a gel structure is constructed. This structure has been revealed to have unique effects when used in emulsified system. Namely, by using the whey-protein-containing solution of the present invention, problems such as water dissociation or the like can be effectively prevented, whereas such problems make manufacturing difficult with conventional technologies. This is because the whey-protein-containing solution is slowly and statically polymerized into a gel such that it solidifies in a strong state of affinity with other materials. Furthermore, said processed foods can be manufactured easily. For example, in order to manufacture a processed food consisting of the above-mentioned W/O or O/W type emulsion system, the whey-protein-containing solution is mixed with fat, the mixed solution is emulsified, monovalent or divalent salt-derived ions are added to the emulsion, the resulting emulsion is further stirred and then refrigerated.

Specifically, it is possible to manufacture low-fat butter, low-fat cheese or the like.

For example, in manufacturing a low-fat butter with a fat content of about 40% using conventional methods, there remains the problem that water dispersion to form the W/O type emulsion is difficult due to the reduced fat content and thus the emulsion is unstable. It was difficult to finely dispersed water in the butter structure simply by adding casein or the whey protein to this high-water, low-fat butter system. However, it is possible to obtain low-fat butter having a smooth structure with a stable W/O emulsion by adding the whey-protein-containing solution of the present invention to form an emulsion, adding a salt solution, and then reemulsifying by stirring, so that water-retention capacity increases with the formation of whey protein gel of increased viscosity.

The next examples are low-fat, low-calorie processed foods containing the whey protein gel as a substitute component for fat. They include low-fat raw ham or the like in which the whey protein gel used in place of fat is integrated into the meat tissue (embodiments S-1, S-3) and low-fat sausages or the like in which pieces of the whey protein gel are contained in place of fat granules (embodiment S-1-2).

A variety of low-fat, low-calorie processed foods of the former type can be manufactured by injecting the whey-protein-containing solution into the principal base material and then by refrigerating without any heat treatment so that gel is solidified in the principal base material. A variety of low-fat, low-calorie processed foods of the latter type can be manufactured by mixing the whey protein gel which is previously cut into pieces of desired sizes.

For example, by injecting the whey-protein-containing solution into a meat base to make raw meat, raw ham or the like and then by simply refrigerating without any heating, the injected solution can form solidified gel inside the meat base. This meat with solidified gel makes low-fat, low-calorie marbled beef and the raw ham with solidified gel makes low-fat, low-calorie raw ham. Furthermore, by injecting a whey protein solution containing fat into meat, fat flavour is added to the meat and a product similar to ordinary marbled beef can be made. Furthermore, this gel component can be used to make coarsely-minced, low-fat, low-calorie sausages by cutting the gel into pieces with a noiseless cutter and then blending into a sausage material.

Since the whey protein gel component has good transparency, it can be used, for example, as a substitute for agar gel, gelatin gel or the like (S-1-1). While conventional heat-coagulated gels are highly turbid and thus can hardly be used as dessert materials which require transparency of the gel, the whey protein gel of the present invention can be used almost unlimitedly in an extremely wide variety of desserts.

Furthermore, the whey protein gel of the present invention functions as a binding agent, a filler and an agent to prevent water-dissociation for hamburger and meatballs in frozen foodstuffs. Gelation takes place in the raw food without cooking and thus foodstuffs of any structure or texture can be easily formed.

Consequently, the whey protein gel component of the present invention is useful in refrigerated foods or frozen foods and in particular is preferably used in processed foods which are served uncooked without heating. On the other hand, the whey protein gel component is resistant to the effects of heat and is essentially resistant to heat-shrinkage so that it is suitable for materials to be cooked by heating before serving.

In embodiment S-1, as an extender, it is suitably used in the fish paste industry.

When the whey-protein-containing solution is used as an extender for a cooked fish paste product such as boiled fish paste, steamed fish paste, fish loaf and fish patties, although it can be added in a higher proportion, such as 70% by weight, it maintains the good texture such as clean bite and good elasticity and it does not interfere with "suwari" which is non-heat gelation prior to cooking, so that a cooked fish paste having a higher gel strength can be produced. For example, a solution containing 5-15% of whey protein is heated at a temperature of 70°-100° C. for 0-30 min. so as to adjust its hydrophobicity to 50 [FI/mg-protein] or more. The solution is added so "surimi", which is a fish paste mixed with sodium chloride, after supplemental materials such as starch, egg white, "mirin", and sugar are added to "surimi" and incorporated therein. The thus-obtained "surimi" is heated at 85° C. for 40 min. based on a conventional process.

Since salt is usually used in preparing "surimi", further addition of salt-derived ions is not necessary to promote gelation.

In addition, instead of the solution, a slurry or a gel form can be used.

If a slurry or gel is used, 0.1-0.5% of salts (monomalent or divalent) may be added to a heat-treated solution containing whey protein to form a slurry or gel. Alternatively, 0.5-3.0% of phosphate and 1-20% of fat, and optionally 1-10% of potato starch, may be added to the solution followed by freezing it. The resultant frozen material, when used, can be defrosted and then added to "surimi".

EXAMPLES

The present invention will be more clearly understood with reference to the following examples.

EXAMPLE 1

Effects of the amounts of sodium chloride on texture, water retention and transparency in gel preparations induced by salt-derived ions and by heat (conventional gel) were investigated as follows to compare characteristics of the two gels.

The final concentration of the added sodium chloride after mixing ranged between 0 to 0.5M. Since sodium chloride is completely soluble, the molar concentration of sodium ion can be considered to be the same as that of sodium chloride.

(1) Preparation of Ion Induced Gel

One hundred grams of WPI (Bio-Isolates Ltd., Bipro, protein: 97% by dry weight, ash: 2%) was dissolved in deionized water to make a solution of total weight of 1000 g (whey protein concentration : 10%, ash: 0.2%, pH 7). The solution was heated to 85° C. in a hot water bath and then allowed to stand for 25 minutes at this temperature. The solution was cooled to 20° C. and 85 g aliquots of the solution were put into beakers and each was mixed with 15 g of a given concentration of salt solution. A glass tube (inner diameter: 25 mm, length: 15 mm) with a plastic film at the bottom was quickly filled with each portion of the whey protein solution mixed with the salt solution and covered with a glass plate on the top and allowed to stand at 20° C. for 24 hours for gelation.

(2) Preparation of Heat-induced Gel

WPI was dissolved in deionized water at a concentration of 10% as described in Example 1 and then 85 g of the solution is put into a beaker and mixed with 15 g of salt solution at a given concentration. The whey protein solution mixed with the salt solution was poured into a glass tube with a glass plate at the bottom as described in Example 1. Another glass plate was placed on top of the tube and both plates were tightly tied with strings so as not to move. The glass tube was placed in a water bath at 40° C. The temperature of the water bath was increased to 85° C. in 20 minutes and then maintained for another 20 minutes. The temperature was then gradually decreased to 40° C. in about 20 minutes by introducing tap water into the bath. The glass tube was taken out of the water bath and then allowed to stand at 20° C. for 24 hours. The gels thus formed were measured for analysis.

Measurement of Textural Characteristics

Instrument for measurement: Reometer (Hudo Kogyo Co., Ltd.), Clearance: 5 mm
Plunger diameter: 50 mm
Compression rate: 2 cm/min
Number of compressions: 2 times
Measurement temperature: 20° C.

Calculation Method for Parameters

Gel strength: Maximum load (g) of first compression
Elasticity: Distance (mm) from the point where a response was observed with the second compression to a clearance of 5 mm.

Measurement of Water Dissociation

Gel was placed in a petri dish with 5 sheets of filter paper (Toyo filter paper No. 2, diameter: 5.5 cm) and the dish was allowed to stand at 20° C. for 3 hours. The amount of dissociated water was calculated from the amount of water absorbed by the filter papers.

Water dissociation (%)=(Weight of water absorbed by filter papers/Gel weight)×100

The results of the measurements for the textural characteristics and water dissociation are shown in FIG. 1. No gel was formed in both cases when no sodium chloride was added.

In the ion induced gel, gel strength and elasticity were increased with an increase in the concentration of sodium chloride.

In the heat-induced gel in which sodium chloride was added before heating, the elasticity did not change so much as a function of the concentration of sodium chloride whereas the gel strength was decreased with an increase in the concentration of sodium chloride added.

The rate of water dissociation was low in the ion induced gel and was not affected by sodium chloride concentration. In contrast with this, it is shown that the rate of water dissociation increased with an increase in sodium chloride concentration so that water-retention capacity of the protein was decreased. In other words, in the heat-induced gel, aggregation between the whey protein molecules, which takes place during heating, becomes excessive with an increase in salt concentration, which means a fine matrix cannot be formed; in contrast with this, in the ion-induced gel, aggregation between the whey protein molecules does not occur in the heating process and when salt is added, the molecules are already disentangled so as to be ready to form a fine matrix, so that a finer matrix is formed with an increase in the salt concentration.

A photograph in the place of a drawing, FIG. 7, shows the difference in appearance between the gels. The ion-induced gels were all transparent although the transparency slightly decreased with an increase in the salt concentration. All the heat-induced gels were completely turbid.

It was thus demonstrated that the ion-induced gel has good water-retention capacity and is transparent or semitransparent.

EXAMPLE 2

Effects of the salt-derived ion salts were confirmed using a solution or suspension of KCl, NaCl, $MgSO_4 \cdot 7H_2O$, $CaSO_4 \cdot 2H_2O$, $Na_2O_4$, $K_2SO_4$ at a concentration of 0.2M. On the assumption that salts which are not completely soluble are dissolved before the gelation ends, the molar concentrations of salts are considered as the molar concentrations of the corresponding salt-derived ions. However, ion concentrations in salts which generate 0.4M salt-derived ions from 0.2M salts are considered to be twice the salt concentrations.

Eighty grams each of WPI solution which was prepared by heating and cooled to 20° C. in the same manner as described in Example 1 (1) was put into a beaker and mixed with 20 g of the above-mentioned solution or dispersion of salts (final WP concentration: 8%, salt concentration: 0.2M). The whey protein solution mixed with the salt was rapidly poured into a glass tube (inner diameter: 25 mm, height: 15 mm) with plastic film at the bottom and the tube was covered with a glass plate and was then allowed to stand at 20° C. for 24 hours to form the gel.

Textural characteristics were determined in the same manner as described in Experiment 1.

Figure 2B:
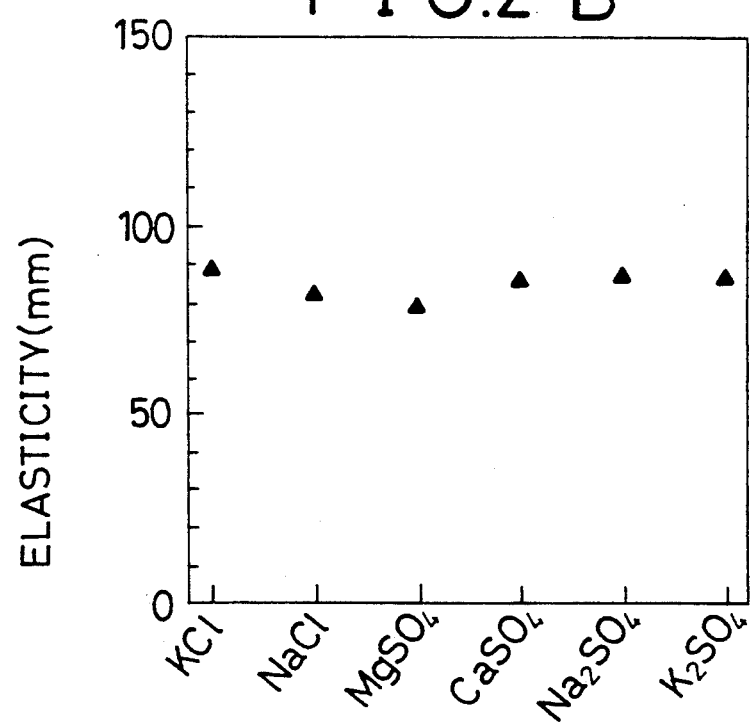

The results of the measurements of textural characteristics are shown in FIG. 2. Good quality gels were obtained with all the salts tested but the gel strength varied as a function of the type of salt used. Gels with divalent salt-derived ions had greater gel strength than those with monovalent salt-derived ions and gels with sulfates had greater gel strength than those with chlorides; therefore it was considered that the higher the ionic strength, the greater was the gel strength.

EXAMPLE 3

This Example was to investigate the effects of the temperature of the WPI solution at the time of salt addition and the standing temperature after the addition of salts on the textural characteristics of the gel.

The WPI solution was heated in the same manner as described in Example 1 and 95 g aliquots of the solution were transferred into beakers and when the temperature of the WPI solution reached 65, 35 or 5° C., respectively, 5 g of a sodium chloride solution was added to each beaker. The concentration of sodium chloride after the addition was 0.2M.

The WPI solution was poured into glass tubes in the same manner as described in Example 1 and then allowed to stand at 5° C. or 20° C. for gel formation. After 24 hours, the textural characteristics were measured. The texture characteristics were measured also after 48 hours with gel which was allowed to stand at 20° C.

Figure 3:
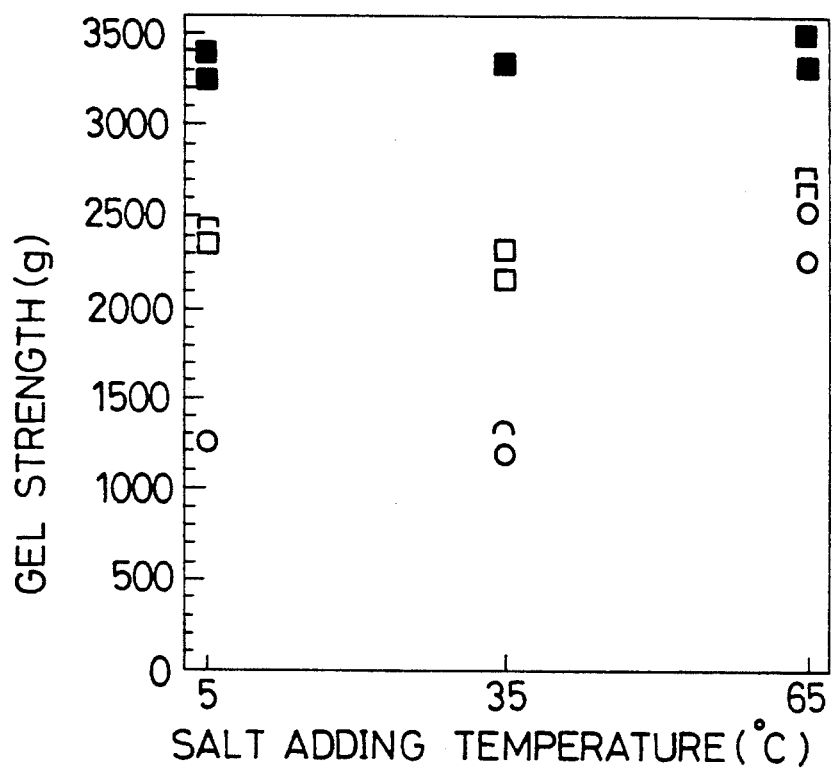
FIG. 3 shows the correlation between the temperatures for the addition of salt and for standing in the static state in the ion-induced gel prepared as described in Example 3.

The results of the textural measurements were shown in FIG. 3.

In the gel which was allowed to stand at 5° C. for 24 hours, the gel strength increased with an increase in the temperature of the WPI solution upon the addition of sodium chloride. However, in the gel which was allowed to stand at 20° C. for 24 or 48 hours, the effects of temperature upon the addition of sodium chloride was small, meaning that satisfactory gel strength can be achieved at any mixing temperature.

Furthermore, the gel strength was greater, the longer the gel was allowed to stand. From these results, it was shown that the higher the temperature for salt addition and higher the standing temperature, the more rapidly gel formation proceeded and also that gel strength increased with time.

In the case where the temperature for salt addition is relatively high, gelation thereafter proceeds satisfactorily even if the standing temperature is not specifically controlled; whereas in the case where the temperature for salt addition is relatively low, gelation can be facilitated by raising the standing temperature.

EXAMPLE 4

Low Fat Butter-like Spread

WPI (see Example 1) was dissolved in tap water at a concentration of 6% (WP concentration: 6%, ash: 0.13%, pH 6.9), and the solution was heated at 95° C. for 25 minutes. 2705 g of this WPI solution and 1840 g of butter oil melted at 60° C. were mixed in a TK homomixer (a product of Tokushu Kika Kogyo) at 3000 rpm for 10 minutes for emulsification and then the resulting emulsion was cooled to 5° C. and stored overnight.

The emulsion was stirred with a pin-shaft machine (a product of Schroder Kombinator) at 1000 rpm for 11 minutes. After the emulsion was confirmed to be converted to a water-in-oil type emulsion, 55 g of sodium chloride (corresponding to 0.2M in a final product) was added and then the emulsion was stirred for 3 minutes. After the stirring was completed, the emulsion was poured into 200-ml-volume polyethylene containers and cooled to 5° C. to obtain a butter-like product.

Evaluation of the product was carried out after storage at 5° C. for 2 weeks.

The results of the evaluation are shown in Table 1. Further, products for comparison were manufactured in the following manners. The results of evaluation of these product are also shown in Table 1.

COMPARATIVE EXAMPLE 1

In the place of the heat-treated whey protein solution, an untreated whey protein solution at the same concentration was used to produce an emulsion in the same manner as described in Example 4. The evaluation of the product was carried out after storage at 5° C. for 2 weeks.

COMPARATIVE EXAMPLE 2

4545 g of 40%-fat raw cream was worked up in the same manner as described in Example 4, and 55 g of sodium chloride was added to produce an emulsion. The evaluation of the product was carried out after storage at 5° C. for 2 weeks.

Test for Water Dissociation

Ten grams samples of each product were placed on a petri dish with a diameter of 10 cm and spread out with 10 strokes with a spatula. Then, the presence of water drops was confirmed with the naked eye.

Thermal Melting Test

Bread was toasted at 230° C. for 5 minutes in an oven and then 10 g samples each were spread on the bread to evaluate the melting quality on the bread and in the mouth.

TABLE 1

| | Water dissociation | Melting on the bread | Melting in the mouth |
|---|---|---|---|
| Example 4 | Not observed. | Good. Extremely soft particles remained finely scattered but integrated well with the melted fat. | Good. |
| Comparative Example 1 | Observed. | Water drops were released. | Good. |
| Comparative Example 2 | Observed. | Water drops were released. | Good |

From the results shown above, it was revealed that in the product of the Example, water drops remained stable in the oil phase in spite of the fact that the water phase is as large as 60% and, moreover, thermal melting was good and there was no effect on melting in the mouth.

EXAMPLE 5

Marbled-beef-like Roast Beef.

168 g of WPC (a product of Express Food, Type 7502, protein: 75%, ash: 5%) was dissolved in water to make a solution of 1866 g (WP content: 9%, ash: 0.27%, pH 6.9) and heated at 87° C. for 25 minutes with stirring. Water was added to make the solution 2000 g. 800 g of purified beef tallow was melted at 60° C. and added to the above-mentioned WPC solution. The solution was first emulsified and then homogenized with a high pressure homogenizer and then rapidly cooled to 5° C. on a cooling plate.

28 g of sodium chloride and 2 g of sodium triphosphate were dissolved in water to make a solution of 400 g and then the solution was injected into 4000 g of beef round meat. The meat was allowed to stand at 2° to 3° C. for 4 hours. Then, the above-mentioned WPC emulsion was injected into 800 g of the meat. The meat was burned using a gas burner to scorch the surface, cooled to 5° C. and then allowed to stand overnight. In this case, the sodium ion concentration was calculated as about 0.4M assuming that the salt used was completely dissolved and present as ion after being injected into the meat and that the specific volume of the emulsion was 1. During heating, in order to prevent color change inside the meat by the heat, the temperature inside was maintained at 50° C. or lower. The meat processed as mentioned above was sliced into 3-mm thick slices for investigation. The WPC emulsion had coagulated and solidified inside the meat to make marbled-beef-like roast beef with fat appropriately dispersed.

EXAMPLE 6

Ham

A heated-WPI-containing solution was prepared in the same manner as described in Example 1 and added at a concentration of 10% to meat stored in salt at a concentration of 2%. The meat was poured into a casing and allowed to stand at 5° C. overnight. In this case, the sodium ion concentration corresponds to about 0.3M. After gelation of the whey protein, ham was produced in the usual manner by drying and smoking. As a result, excellent ham was obtained and the yield after heating was increased by 20% as compared to ham made in a conventional way because of the high heat stability of the gel.

EXAMPLE 7

Dessert Foodstuffs 82.4 kg of the heated WPI-containing solution prepared in the same manner as described in Example 1 was mixed with 6.8 kg of skim milk powder, 10.6 kg of granulated sugar and 0.1 kg of almond flavoring and the mixture was allowed to stand for 2 hours to obtain a gel-like material. In this case, salt-derived ions were provided by skim milk powder and the concentration was roughly estimated as 0.5%. This material was cut into cubes of about 2 cm$^2$ in volume and mixed with syrup or syruped fruits to produce a dessert foodstuff. The whey protein gel was smooth and had an excellent flavour.

EXAMPLE 8

WPI powder

WPI (whey protein isolate, Bio-Isolates Ltd., Bipro; 97% protein and 2% ash by dry weight) was dissolved in deionized water to prepare solutions at concentrations of 3%, 7% and 11%. Each solution was heated at temperatures of 72° C. and 82° C. and the resulting WPI solutions were freeze-dried to obtain WPI powders. Each WPI powder obtained (20 g) was dissolved with the addition of 180 g of deionized water and mixed with skim milk (ash, 7.9%) (17 g). After dissolution, the solution was allowed to stand at 20° C. for 16 hours.

In the procedures described above, the solubility and gel forming capacity of the WPI powder were examined with the naked eye. The results are shown in Table 2 (solubility) and Table 3 (gel forming capacity).

TABLE 2

| Heating temperature (°C.) | Solubility WPI concentration (%) | | |
|---|---|---|---|
| | 11 | 7 | 3 |
| 72 | X | ○ | ○ |
| 82 | X | ○ | ○ |

TABLE 3

| Heating temperature (°C.) | Gel forming capacity WPI concentration (%) | | |
|---|---|---|---|
| | 11 | 7 | 3 |
| 72 | — | ○ | V |
| 82 | — | ○ | ○ |

In the Table, O represents good, X represents no good and V represent intermediate. It was supposed that in the solution containing 11% of the WPI, the solubility of the powder was not sufficient and denaturation occurred during heating, whereas in the solution in which the WPI concentration was 3% or 7%, solubility was sufficient. Furthermore, in the solution containing 7% WPI, sufficient gel was formed independently of the temperature for the heat treatment, whereas in the solution containing 3% WPI, the sufficient gel was not formed unless the heating temperature was high enough. This indicates that in a solution containing WPI at a low concentration, more adequate deformation of the whey protein molecules are necessary.

Further, all the gels appeared to have homogeneous structures.

Figure 4:
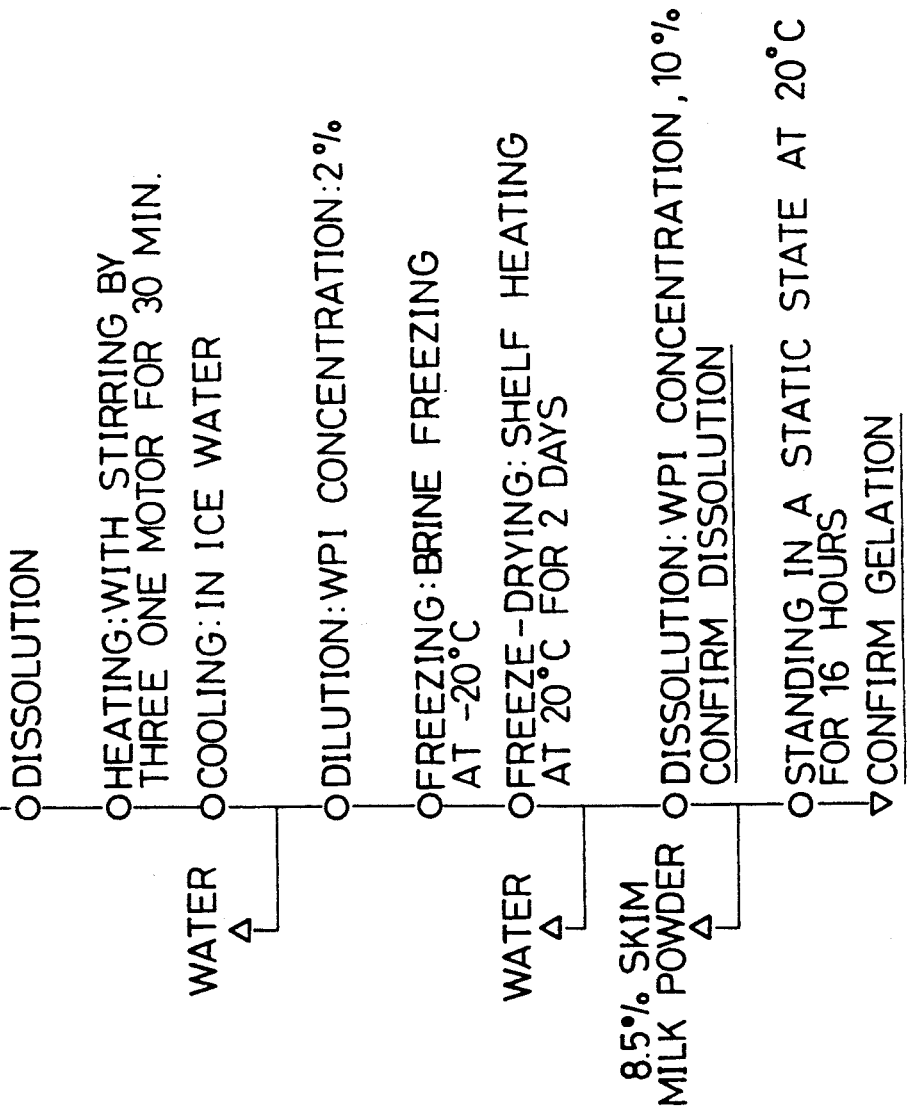
FIG. 4 is a simplified flow-sheet illustrating the process in Example 8.

FIG. 4 is a flow-sheet of this Example.

EXAMPLE 9

Mixture Containing WPI Powder

A WPI solution was prepared in the same manner as described in Example 8. The concentration of WPI was 5% and heat treatment was carried out at 72° C. for 30 minutes (stirred and heated in a surge tank). When 20 liters of the WPI solution was cooled down to 20° C., 1 kg of dextrin (NSD 230, a product of Nippon Shokuryo Kogyo, Co., Ltd.) was added and dissolved. The solution was made into powder using a spray drying device (Niroatomeizer-Production Miner type, a product of Niro).

3.5 kg of granulated sugar and 10 g of flavoring agent were added to 2 kg of powder obtained (WPI, 50%) to obtain a mixture.

This mixture was dissolved in deionized water to make the WPI concentration 10% and the solubility was examined with the naked eye. Then, skim milk powder (ash, 7.9%) was added at a concentration of 10%. The solution was allowed to stand at 20° C. for 6 hours to examine gelating capacity with the naked eye. The results showed that the mixture containing WPI powder was very soluble and formed a high-quality gel with the addition of skim milk powder to obtain a milk-jelly-like product.

Figure 5:
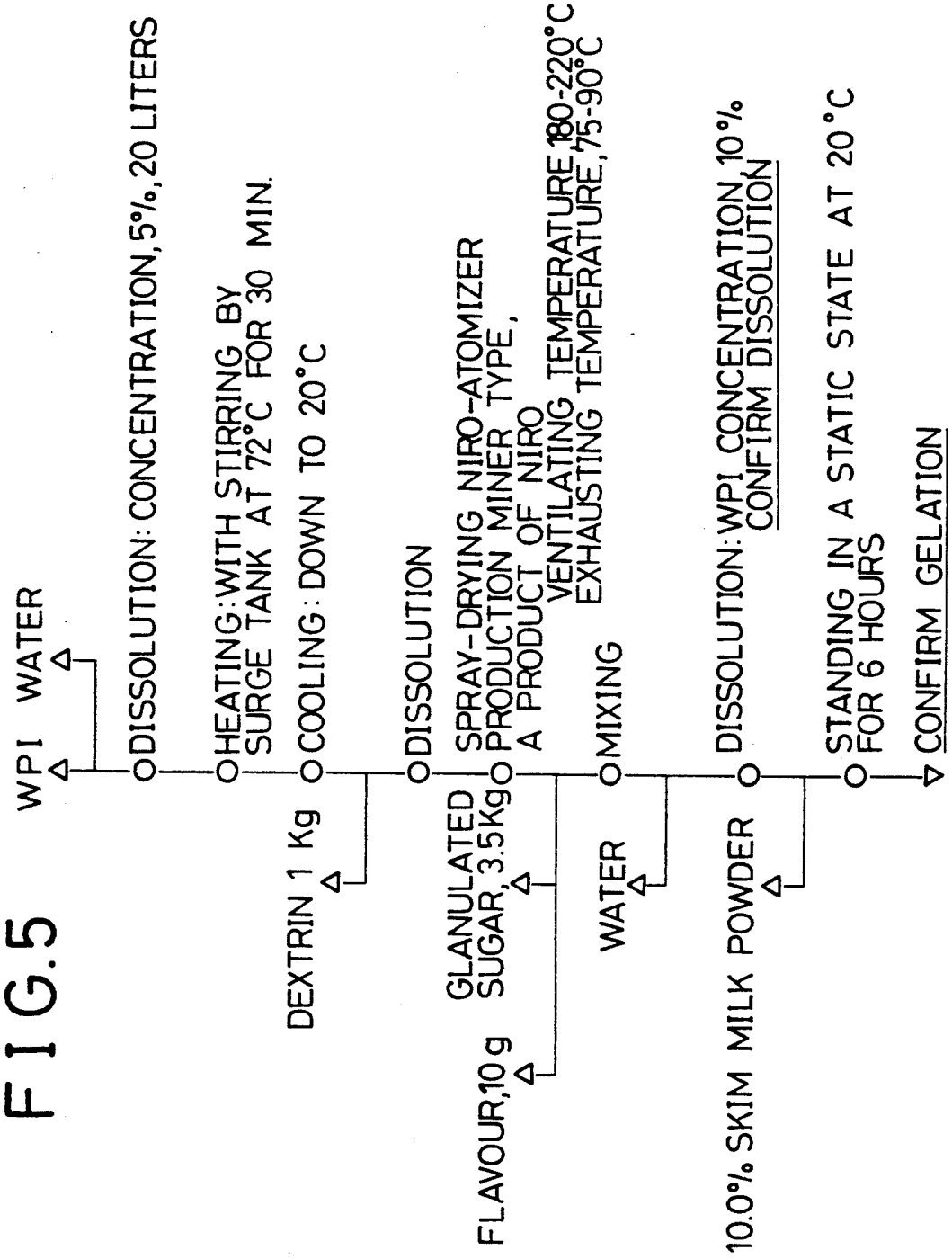
FIG. 5 is a simplified flow-sheet illustrating the process in Example 9.

FIG. 5 is a flow chart for this Example.

EXAMPLE 10

A Cooked Fish Paste

A cooked fish paste was produced according to the following process:

Preparation of Whey-protein-containing Solution Treated by Heat

A whey protein concentrate (WPC) (protein content: 75%, FAT: 5.87%, moisture: 5.50%) was dissolved in water to a protein concentration of 6.5% (a concentration of WPC was 8.7%). The resultant solution (hereinafter referred to as solution WPC) was heated at 80° C. for 20 min. so as to prepare a heat-treated WPC solution having a hydrophobicity of 140 [FI/mg-protein] (hereinafter referred to as solution HWPC).

In addition, solution WPC was subjected to spray-drying to obtain a powder.

In the same way, a whey protein isolate (WPI) (protein content: 95%) was dissolved in water to a protein concentration of 6.5% (WPI concentration of 6.9 The resultant solution (hereinafter referred to as solution WPI) was treated by heat to obtain a heat-treated WPI solution (hereinafter referred to as solution HWPI).

Preparation of Whey Protein Slurrys and Gels 1.5% of sodium chloride was added to solution HWCP or a solution, which was obtained from the powder derived form solution HWPC and which had a protein concentration of 6.5%, and the resultant solution was allowed to stand at 30° C. for 4 hours to obtain a WPC slurry (hereinafter referred to as slurry HWPC).

By the same means, a WPI gel was obtained and then broken up (hereinafter referred to as gel HWPI).

Preparation of Cooked Fish Pastes 700 g of a high grade "surimi" (no salt added) was processed using a noiseless cutter for 5 min.

21 g of sodium chloride was added to the cutter-processed "surimi" followed by kneading the "surimi" for 5 min.

To the resultant "surimi" was added 210 g of solution WPC, HWPC, WPI, HWPI, slurry HWPC or gel HWPI, 210 g of water, 35 g of starch, 35 g of egg white, 7.5 g of "mirin" and 7.5 g of sugar and then kneaded for 6 min. Approximately 160 g of the resultant mixture was packed into a container and allowed stand at 5° C. overnight (a "suwari" process). The resultant mass was heated to 85° C. for 40 min. to obtain a cooked fish paste.

As clearly shown in table 4, based on the organoleptic test, the cooked fish pastes obtained from solutions HWPC and HWPI, slurry HWPC and gel HWPI all had better qualities than those obtained from solutions WPC and WPI as well as control W (obtained from water).

The cooked fish pastes from solutions WPC and WPI had better qualities than that from control W, because the production process of the cooked fish paste involved the process of heating with salts to that those whey protein solutions could undergo ordinary gelation to form heat-induced gels. However, the cooked fish paste from solutions WPC and WPI were not as good as those from solutions HWPC and HWPI with respect to both gel strength and organoleptic scores.

The cooked fish paste from slurry HWPC had better properties than that from solution HWPC. However, the cooked fish paste from gel HWPI did not have as good properties as that from solution HWPI.

The cooked fish pastes using WPI were considered better than those from WPC, because WPI has a higher concentration of whey protein than WPC.

TABLE 4

|  | Hardness | Organoleptic test |
| --- | --- | --- |
| Control W | ± | ± |
| Solution WPC | +1 | +1 |
| Solution HWPC | +2 | +2 |
| Slurry HWPC | +4 | +3 |
| Solution WPI | +3 | +2 |
| Solution HWPI | +4 | +4 |
| Gel HWPI | +3 | +3 |

*Values are expressed as relative scores, compared to control W.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A gellable solution of heat denatured whey proteins having a hydrophobicity (FI mg-protein) of at least 50, which solution has a protein concentration of 0.5 to 20%, a pH of 6.0 to 9.0, an ash concentration of less than 1.0%, and undergoes irreversible gelation by the addition thereto of monovalent or divalent salt-derived ions, which solution is produced by heating a corresponding solution of non-denatured whey protein to a non-coagulating temperature higher than that required to denature the whey protein therein and which would coagulate a whey protein solution of higher ash content.

2. The whey-protein-containing solution as set forth in claim 1 which is heated at 65° C. or higher for 2 seconds to 60 minutes under a pressure of 1 to 1.2 atm.

3. The whey-protein-containing solution as set forth in claim 1 wherein the hydrophobicity of the whey protein in the solution is 100 FI/mg-protein or more.

4. The whey-protein-containing solution as set forth in claim 1 wherein, the whey protein concentration in the solution is 2 to 15%.

5. A whey-protein-containing powder obtained by freeze-drying the whey-protein-containing solution as set forth in claim 1 wherein the whey protein concentration is 0.5 to 10%.

6. A whey protein gel product obtained by the addition of monovalent or divalent salt-derived ions to the whey-protein-containing solution as set forth in claim 1.

7. A whey, protein gel product obtained by dissolving the whey-protein-containing powder as set forth in claim 5 in an aqueous liquid and adding monovalent or divalent salt-derived ions to the resulting solution.

8. A whey protein gel product as set forth in claim 6 wherein said monovalent or divalent salt-derived ions are salt-derived ions provided by one or more salts selected from the group consisting of sodium chloride, potassium chloride, magnesium sulfate, calcium sulfate, sodium sulfate, calcium chloride, potassium sulfate, sodium polyphosphate, sodium diphosphate and sodium monophosphate.

9. A whey protein gel product as set forth in claim 6 wherein said monovalent or divalent salt-derived ions are salt-derived ions provided by whole milk, skim milk powder, cheese, condensed milk or flavoring agents.

10. A whey protein gel product as set forth in claim 6 wherein the concentration of said monovalent or divalent salt-derived ions is 0.02M or higher.

11. A whey protein gel product as set forth in claim 6 which is obtained at a temperature lower than the heat-denaturation temperature for the whey protein after the addition of monovalent or divalent salt-derived ions.

12. A whey-protein-containing powder composition which comprises 20-65% by weight of the whey-protein-containing powder as set forth in claim 5, 20-55% by weight of skim milk powder and 15-60% by weight of saccharides.

13. Dessert or hors d'oeuvre jelly or the like produced by adding monovalent or divalent salt-derived ions to a mixture comprising the whey-protein containing solution as set forth in claim 1 and a seasoning component.

14. A processed meat or fish food or the like containing crushed pieces of the whey-protein-containing gel product as set forth in claim 6 as a fat substitute.

15. A processed food comprising a W/O (water-in-oil) or O/W (oil-in-water) type emulsion obtained by adding monovalent or divalent salt-derived ions to an emulsion comprising the whey-protein-containing solution as set forth in claim 1 and fat.

16. A processed meat or fish food obtained by injecting the whey-protein-containing solution as set forth in claim 1 into a shaped meat or fish product containing monovalent or divalent salt-derived ions.

17. A processed food containing the whey protein gel product as set forth in claim 6 and adapted for use as a fat substitute, an adhesive agent, or a filler or agent for preventing water dissociation.

18. A cooked fish paste product comprising the whey-protein-containing solution as set forth in claim 1 or a whey-protein-containing slurry or gel obtained by the addition of monovalent or divalent salt-derived ions to said whey-protein-containing solution, and a fish paste.

19. An instant dessert or hors d'oeuvre jelly mixture or the like comprising the whey-protein-containing powder as set forth in claim 5, a source of monovalent or divalent salt-derived ions and a seasoning component.

20. An instant dessert mixture or the like for milk admixture preparations comprising the whey-protein-containing powder as set forth in claim 5 and a seasoning component.

21. A whey protein gel product as set forth in claim 7 wherein said monovalent or divalent salt-derived ions are salt-derived ions provided by one or more salts selected from the group consisting of sodium chloride, potassium chloride, magnesium sulfate, calcium sulfate, sodium sulfate, calcium chloride, potassium sulfate, sodium polyphosphate, sodium diphosphate and sodium monophosphate.

22. A whey protein gel product as set forth in claim 7 wherein said monovalent or divalent salt-derived ions are salt-derived ions provided by whole milk, skim milk powder, cheese, condensed milk or flavoring agents.

23. A whey protein gel product as set forth in claim 7 wherein the concentration of said monovalent or divalent salt-derived ions is 0.02M or higher.

24. A whey protein gel, product as set forth in claim 7 which is produced at a temperature low than the heat-denaturation temperature.

25. A processed meat or fish food or the like containing crushed pieces of the whey-protein-containing gel product as set forth in claim 7 as a fat substitute.

* * * * *